US012542429B2

(12) United States Patent
Huang et al.

(10) Patent No.: US 12,542,429 B2
(45) Date of Patent: Feb. 3, 2026

(54) DIRECT CURRENT SWITCHGEAR

(71) Applicant: Schneider Electric Industries SAS, Rueil-Malmaison (FR)

(72) Inventors: Haibo Huang, Shanghai (CN); Min Li, Shanghai (CN); Gang Wang, Shanghai (CN); Xiaoqiang Lei, Shanghai (CN); Bingchang Wu, Shanghai (CN); Dabin Wu, Shanghai (CN); Hongwei Wu, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 192 days.

(21) Appl. No.: 18/215,209

(22) Filed: Jun. 28, 2023

(65) Prior Publication Data

US 2024/0006860 A1 Jan. 4, 2024

(30) Foreign Application Priority Data

Jun. 30, 2022 (CN) .......................... 202210772466.8

(51) Int. Cl.
*H02B 13/025* (2006.01)
*H02B 1/20* (2006.01)
*H02B 1/30* (2006.01)

(52) U.S. Cl.
CPC ............. *H02B 13/025* (2013.01); *H02B 1/20* (2013.01); *H02B 1/305* (2013.01)

(58) Field of Classification Search
CPC . H02B 1/20; H02B 1/24; H02B 1/305; H02B 13/025; H02B 11/167; H02B 11/04;
(Continued)

(56) References Cited

U.S. PATENT DOCUMENTS 8,946,581 B2 * 2/2015 Yabu .................... H02B 13/075
361/752
9,923,343 B2 * 3/2018 Mun ...................... H02B 1/306
(Continued)

FOREIGN PATENT DOCUMENTS

CN 204732355 U 10/2015
CN 109390867 A 2/2019
(Continued)

OTHER PUBLICATIONS

Translation of CN 209267161 U (Original document published Aug. 16, 2019) (Year: 2019).*
(Continued)

*Primary Examiner* — William A Bolton
(74) *Attorney, Agent, or Firm* — Wolf, Greenfield & Sacks, P.C.

(57) ABSTRACT

A DC switchgear includes: an instrument compartment in which secondary components for monitoring, protecting and measuring are arranged; a busbar compartment in which a main busbar and a first fixed contact connected with the main busbar is arranged; a cable compartment in which a conductor is arranged for connecting to a cable, and a second fixed contact connected with the conductor is further arranged in the cable compartment or the busbar compartment; and a handcart compartment in which a handcart capable of moving in and out of the handcart compartment is arranged, wherein a current-carrying branch, a commutation branch and an energy-absorbing branch are arranged on the handcart, a first and a second movable contacts respectively for contacting with the first and the second fixed contacts are further arranged on the handcart, and the first and the second movable contacts are respectively connected to both ends of the current-carrying branch.

6 Claims, 2 Drawing Sheets

(58) Field of Classification Search
CPC ....... H02B 11/24; H02B 11/26; H02B 11/173; H01H 9/542; H01H 2009/543; H01H 33/596; H02H 7/266; H02H 7/268
USPC .................. 218/157, 155, 156, 139, 134, 75
See application file for complete search history.

(56) References Cited

U.S. PATENT DOCUMENTS

| | | | | |
|---|---|---|---|---|
| 10,020,643 | B2* | 7/2018 | Zheng | .................. H02B 13/065 |
| 10,177,544 | B2* | 1/2019 | Benke | ........................ G06F 1/16 |
| 10,530,134 | B2* | 1/2020 | Ma | ........................ H02B 13/025 |
| 2019/0045644 | A1* | 2/2019 | Ren | ........................ H02B 1/565 |
| 2020/0099201 | A1* | 3/2020 | Park | ........................ H02B 11/10 |
| 2020/0295543 | A1* | 9/2020 | Kim | .................... H02B 13/025 |

FOREIGN PATENT DOCUMENTS

| | | | | |
|---|---|---|---|---|
| CN | 209267161 U | * | 8/2019 | ............... H02H 7/26 |
| CN | 214707025 U | * | 11/2021 | ............... H02B 1/04 |
| CN | 113991501 A | | 1/2022 | |
| WO | 2019024288 A1 | | 2/2019 | |

OTHER PUBLICATIONS

Translation of CN 214707025 U (Original document published Dec. 11, 2021) (Year: 2021).*
Extended European Search Report dated Nov. 28, 2023 for corresponding European Patent Application No. 23306023.5-1201, 9 pages.
Communication pursuant to Article 94(3) EPC for European Application No. 23306023.5 dated Sep. 18, 2025.

* cited by examiner

DIRECT CURRENT SWITCHGEAR

CROSS-REFERENCE TO RELATED APPLICATIONS

This application claims priority to and the benefit of Chinese Patent Application No. 202210772466.8, filed on Jun. 30, 2022, which is hereby incorporated herein by reference in its entirety.

TECHNICAL FIELD

The invention relates to a DC (direct current) switchgear.

BACKGROUND

With the increasing complexity of power grid structure, the continuous augmentation of power load, and the rapid development of power distribution technology, power users have put forward higher requirements for medium voltage switch products. Flexible DC power transmission, which is a new type of DC power transmission technology developed in recent decades, has more and more prominent advantages, and its suited DC switchgear has also gradually emerged. However, compared with AC switchgear, DC switchgear has more components, and its structure and layout need to be improved in order to facilitate overhaul and maintenance.

SUMMARY

In view of the above, one aspect of the present disclosure provides a DC switchgear which comprises an instrument compartment, a busbar compartment, a cable compartment, a handcart compartment and a handcart. Secondary components for monitoring, protecting and measuring are arranged in the instrument compartment. A main busbar and a first fixed contact connected with the main busbar are arranged in the busbar compartment. A conductor for connecting to a cable is arranged in the cable compartment. A second fixed contact connected with the conductor is further arranged in the cable compartment or the busbar compartment. The handcart is capable of moving in and out of the handcart compartment, a current-carrying branch, a commutation branch and an energy-absorbing branch are arranged on the handcart, a first movable contact and a second movable contact respectively for contacting with the first fixed contact and the second fixed contact are further arranged on the handcart, and the first movable contact and the second movable contact are respectively connected to both ends of the current-carrying branch.

The above DC switchgear arranges the entirety of the circuit structure including the current-carrying branch, the commutation branch and the energy-absorbing branch on the handcart to facilitate later overhaul and maintenance of the DC switchgear.

BRIEF DESCRIPTION OF DRAWINGS

Various aspects, features and advantages of the present disclosure will become clearer and easier to understand, from the following description of embodiments of the present disclosure in conjunction with the accompanying drawings, in which.

DETAILED DESCRIPTION

Figure 1:
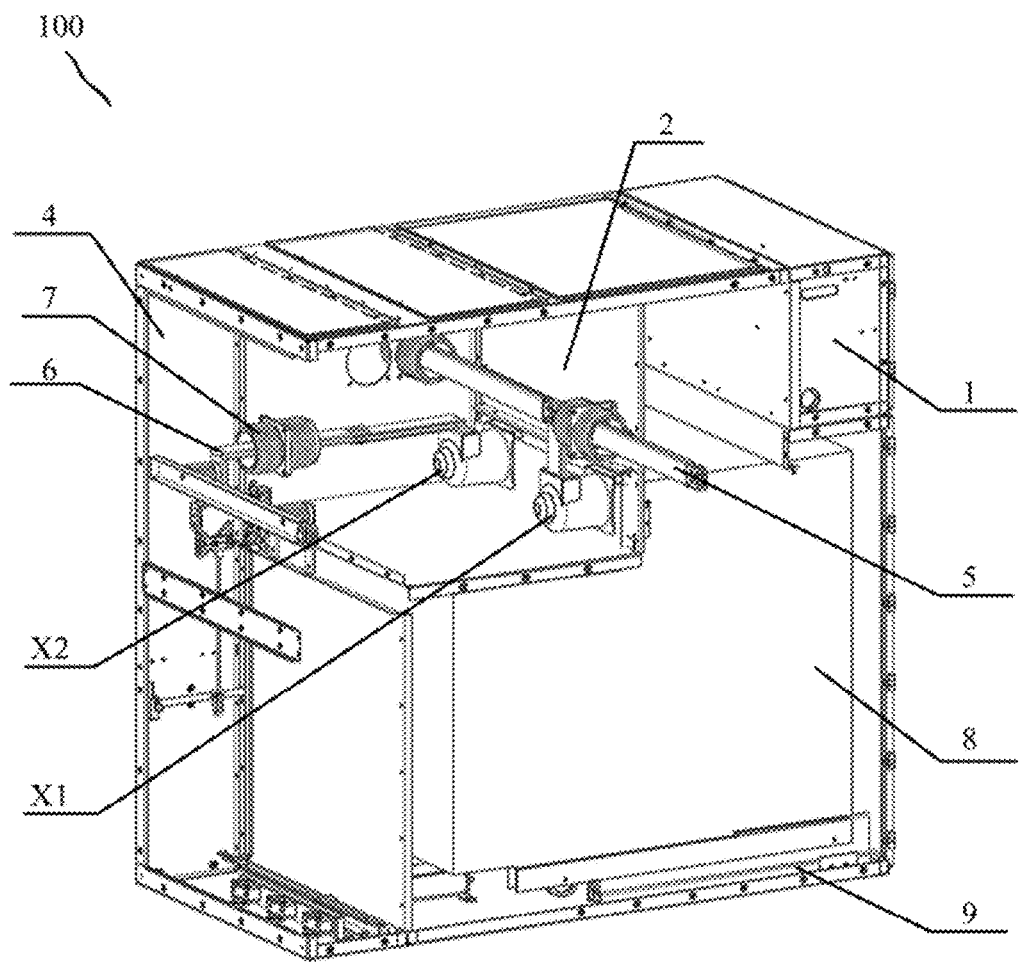
FIG. 1 is a schematic perspective view of a DC switchgear according to an embodiment of the present disclosure.

The present disclosure will be described in detail below with reference to exemplary embodiments thereof. However, the present disclosure is not limited to the embodiments described herein, and it can be implemented in many different forms. The described embodiments are only used to make the present disclosure thorough and complete, and fully convey the concept of the present disclosure to those skilled in the art. Features of the described embodiments may be combined or substituted with each other, unless explicitly excluded or should be excluded according to the context.

Unless otherwise defined, technical or scientific terms used in the present disclosure shall have their ordinary meanings as understood by those with ordinary skills in the art to which the present disclosure belongs. The terms of "first", "second" and the like used in the present disclosure do not indicate any order, quantity or importance, but are only used to distinguish between different components.

In the accompanying drawings, like reference numerals denote the same or similar structural or functional components, and repetitive descriptions about them will be omitted in the following description.

Figure 2:
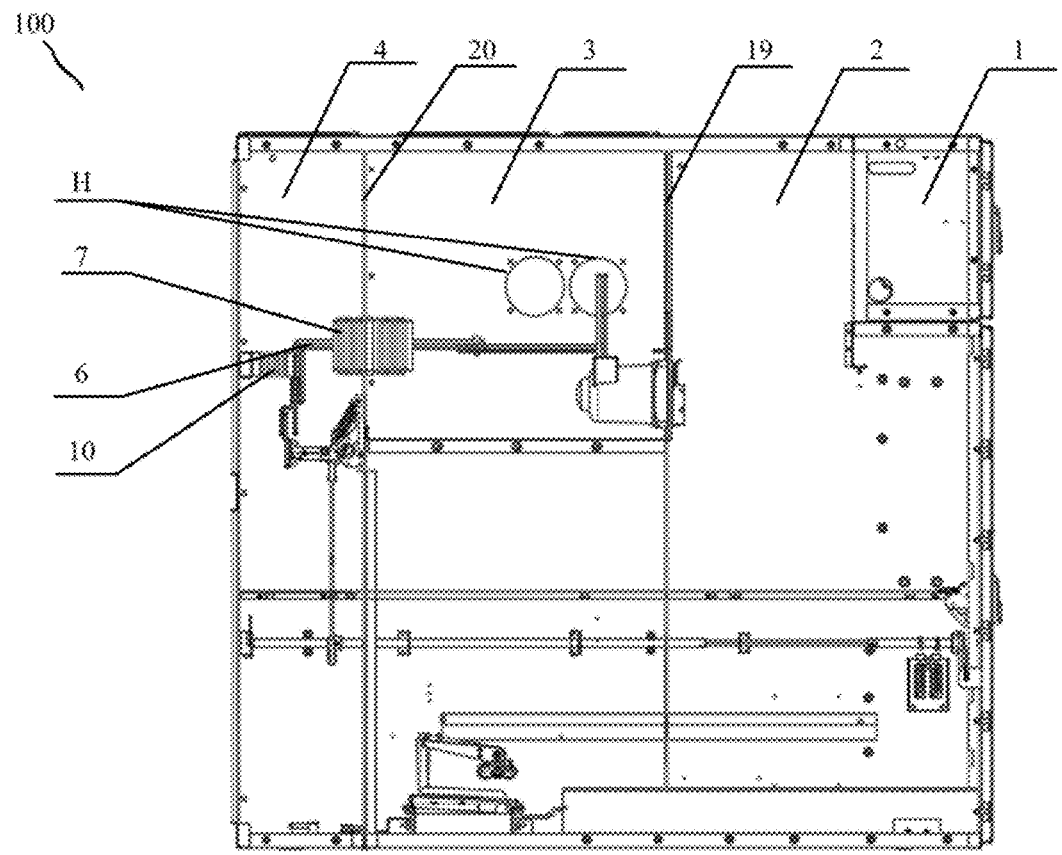
FIG. 2 is a schematic side view of a DC switchgear according to an embodiment of the present disclosure.

FIG. 1 is a schematic perspective view showing a DC switchgear according to an embodiment of the present disclosure. FIG. 2 is a schematic side view of a DC switchgear according to an embodiment of the present disclosure.

Referring to FIGS. 1 and 2, a DC switchgear 100 according to an embodiment of the present disclosure includes four independent compartments: an instrument compartment 1, a handcart compartment 2, a busbar compartment 3 and a cable compartment 4. Their positional layout in the cabinet of the DC switchgear 100 may either be as shown in the figures, or be adjusted adaptively according to the actual application.

Secondary components for monitoring, protecting and measuring are arranged in the instrument compartment 1. The secondary components include but are not limited to relays, watt-hour meters, voltmeters, power meters, frequency meters, air switches, changeover switches, signal lights, buttons, and/or microcomputer integrated protection devices. Such secondary components may be configured to monitor, protect and measure primary components in the DC switchgear 100, including but not limited to current transformers, voltage transformers, ground switches, arresters, circuit breakers and contactors.

A conductor 6 is arranged in the cable compartment 4. When the DC switchgear 100 is being used by a user, one end of a cable is placed into the cable compartment 4 from the bottom of the cable compartment 4 and is connected to the conductor 6, and the other end of the cable is connected to a load.

A main busbar 5 is arranged in the busbar compartment 3. For example, an aperture or an opening H for the main busbar bar 5 to pass through may be arranged on the side wall of the busbar compartment 3. The number of apertures or openings H may be two for respectively arranging two main busbars 5 (for simplicity, only one main busbar 5 is shown in FIG. 1), one of which is configured to connect to the positive electrode, whereas the other of which is configured to connect to the negative electrode. When the main busbar 5 connected to the positive electrode is used by the user, the DC switchgear 100 may be called a positive electrode cabinet, and when the main busbar 5 connected to the negative electrode is used by the user, the DC switchgear 100 may be called a negative electrode cabinet. Such arrangement brings convenience to the user. A first fixed contact F1 connected with the main busbar 5 and a second fixed contact F2 connected with the conductor 6 in the cable compartment 4 may be further arranged in the busbar compartment 3. For example, the conductor 6 may be connected with the second fixed contact F2 through an insulating sleeve 7. The insulating sleeve 7 may pass through a partition board between the cable compartment 4 and the busbar compartment 3 to guarantee the insulation performance of the conductor 6 passing through the cable compartment 4.

The handcart compartment 2 is shown in thick dash line in FIG. 2. A handcart 8 is capable of moving in and out of the handcart compartment 2. For example, a guide rail 9 for the handcart 8 to move on may be arranged in the handcart compartment 2. The circuit structure of the DC switchgear 100 may include a current-carrying branch, a commutation branch and an energy-absorbing branch, all of which are arranged on the handcart 8. A first movable contact M1 and a second movable contact M2 respectively for contacting with the first fixed contact F1 and contacting with the second fixed contact F2 are further arranged on the handcart 8, and the first movable contact M1 and the second movable contact M2 are respectively connected to both ends of the current-carrying branch. For example, the first fixed contact F1 and the second fixed contact F2 may be designed in the form of plugs, while the first movable contact M1 and the second movable contact M2 may be designed in the form of jacks. Alternatively, the first fixed contact F1 and the second fixed contact F2 may be designed in the form of jacks, while the first movable contact M1 and the second movable contact M2 may be designed in the form of plugs. The first fixed contact F1 and the second fixed contact F2 may be encompassed by and in a first insulating box X1 and a second insulating box X2 respectively, and the first insulating box X1 and the second insulating box X2 may be designed to pass through a partition board between the busbar compartment 3 and the handcart compartment 2, so that the first movable contact M1 and the second movable contact M2 are able to contact with the first fixed contact F1 and the second fixed contact F2, respectively, while guaranteeing the insulation performance of the first fixed contact F1 and the second fixed contact F2 passing through the busbar compartment 3. When the handcart 8 moves into the handcart compartment 2 along, for example, the guide rail 9, that is, when the handcart 8 moves from the right side in FIG. 2 towards the left side and into the handcart compartment 2, the first movable contact M1 and the second movable contact M2 on the handcart 8 gradually approach the partition board between the busbar compartment 3 and the handcart compartment 2, until the first movable contact M1 contacts with the first fixed contact F1 within the first insulating box X1 (e.g., inserted into the first fixed contact F1), and the second movable contact M2 contacts with the second fixed contact F2 within the second insulating box X2 (e.g., inserted into the second fixed contact F2), thus realizing the communication of the entire loop.

It should be noted that FIGS. 1 and 2 show that the second fixed contact F2 is located in the busbar compartment 3, but as an alternative implementation, the second fixed contact F2 and the second insulating box X2 encompassing the second fixed contact F2 may also be designed to be located in the cable compartment 4. The difference is that in this case, the second insulating box X2 may be designed to pass through a partition board between the cable compartment 4 and the handcart compartment 2, so that the second movable contact M2 is able to contact with the second fixed contact F2, while guaranteeing the insulation performance of the second fixed contact F2 passing through the cable compartment 4. The position of the second movable contact M2 in the handcart compartment may be correspondingly designed to match the second fixed contact F2. When the handcart 8 moves into the handcart compartment 2 along, for example, the guide rail 9, that is, the handcart 8 moves from the right side in FIG. 2 towards the left side and into the handcart compartment 2, the first movable contact M1 on the handcart 8 gradually approaches the partition board between the busbar compartment 3 and the handcart compartment 2, while the second movable contact M2 on the handcart 8 gradually approaches the partition board between the cable compartment 4 and the handcart compartment 2, until the first movable contact M1 contacts with the first fixed contact F1 within the first insulating box X1 (e.g., inserted into the first fixed contact F1), and the second movable contact M2 contacts with the second fixed contact F2 within the second insulating box X2 (e.g., inserted into the second fixed contact F2), thus realizing the communication of the entire loop.

As such, by arranging the entire circuit structure including a current-carrying branch, a commutation branch and an energy-absorbing branch on the movable handcart, the DC switchgear 100 according to the embodiments of the present disclosure provides convenience for separate tests as well as later overhaul and maintenance of the circuit structure.

Figure 3:
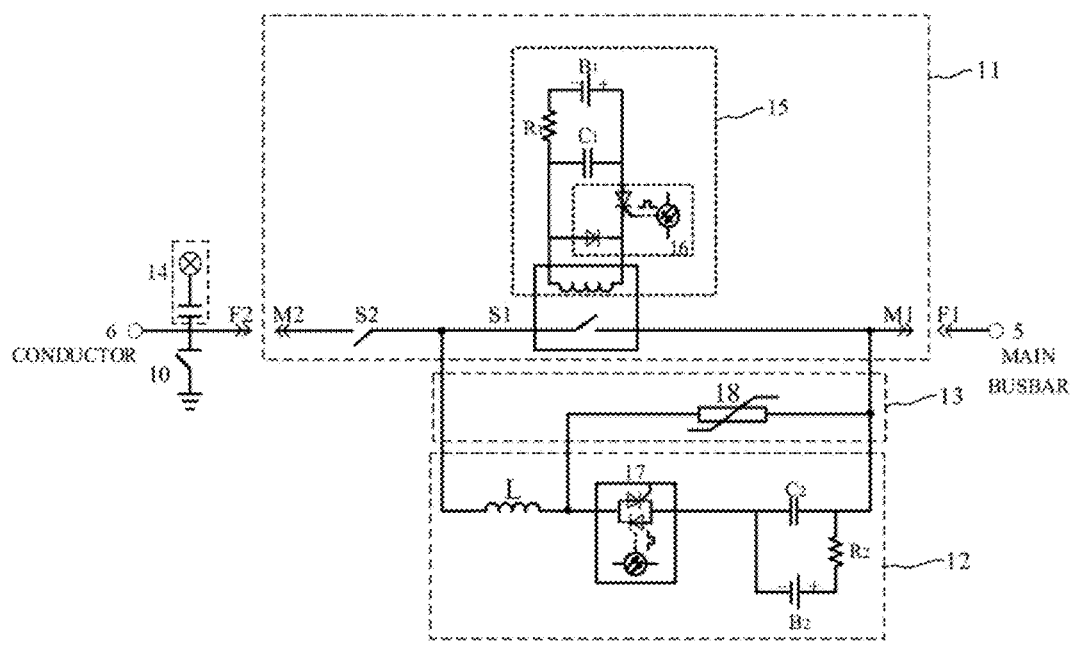
FIG. 3 is a schematic circuit diagram of a DC switchgear according to an embodiment of the present disclosure.

FIG. 3 is a schematic circuit diagram of a DC switchgear according to an embodiment of the present disclosure.

Referring to FIG. 3, the circuit structure of the DC switchgear 100 includes a current-carrying branch 11, a commutation branch 12 and an energy-absorbing branch 13.

The current-carrying branch 11 is configured to carry a current loop during normal operation of the line. The current-carrying branch 11 may include, for example, a main switch S1 and an auxiliary switch S2 which are connected in series. The main switch S1 is configured to quickly break a line fault, and the auxiliary switch S2 is configured to cut off the entire circuit finally. The main switch S1 is connected to the first movable contact M1, and the auxiliary switch S2 is connected to the second movable contact M2. The main switch S1 may be, but not limited to, for example, a sulfur hexafluoride circuit breaker, a vacuum circuit breaker, etc. The current-carrying branch 11 may further include a repulsion mechanism for breaking the main switch S1, as indicated by reference numeral 15 in FIG. 3. The repulsion mechanism 15 may be implemented by means of various technologies. The repulsion mechanism 15 shown in FIG. 3, which is composed of a coil, a capacitor $C_1$, a capacitor charger $B_1$, a capacitor charger protection resistor $R_1$ and a control unit 16, is merely an example, and the present disclosure is not limited thereto.

The commutation branch 12 is configured to produce an oscillation loop and create a zero-crossing point of current when breaking a line fault. The commutation branch 12 may include, for example, a capacitor C2, a commutation switch 17 and a reactor L which are connected in series, and the commutation branch 12 is connected in parallel with the main switch S1. The commutation switch 17 may be implemented employing, for example, a Silicon Controlled Rectifier SCR, but the present disclosure is not limited thereto. The commutation branch 12 also has a capacitor charger $B_2$ and a capacitor charger protection resistor $R_2$.

The energy-absorbing branch 13 is configured to absorb the residual energy after breaking the line fault. The energy-absorbing branch 13 may include, for example, an energy absorber 18 which is connected in parallel with the commutation branch 12. As shown in FIG. 3, it is also possible that the energy absorber 18 is connected in parallel with the commutation switch 17 and the capacitor $C_2$. The energy absorber may be implemented employing, for example, arresters, piezoresistor, etc.

With reference to FIGS. 1, 2 and 3, when the DC switchgear 100 is being used, one end of a cable is placed by the user into the cable compartment 4 from the bottom of the cable compartment 4 and is connected with the conductor 6, and the other end of the cable is connected to a load. The handcart 8 moves into the handcart compartment 2 along, for example, the guide rail 9, the first and second movable contacts contact with the first and second fixed contacts, respectively, and then the main switch S1 and the auxiliary switch S2 are closed, thereby forming a conductive path by the main busbar 5, the first fixed contact F1, the first movable contact M1, the main switch S1, the auxiliary switch S2, the second movable contact M2, the second fixed contact F2, the conductor 6, the cable and the load.

With reference to FIGS. 1, 2 and 3, when a line fault occurs, the main switch S1 is first opened and an arc is formed between its electrodes. When the electrodes reach a certain opening distance, the commutation switch 17 is closed. Then the capacitor $C_2$ forms an oscillation loop with the current-carrying branch 11 by means of the reactor L, generating an oscillation current opposite to the current in the current-carrying branch 11, so that the arc in the main switch S1 is extinguished due to its current being forced to cross zero, thereby breaking the line fault. Then the current is transferred to the commutation branch 12, and the capacitor $C_2$ is charged reversely. When the voltage of the capacitor $C_2$ exceeds the operating voltage of the energy absorber 18, the current is gradually transferred to the energy-absorbing branch 13, until the current of the energy absorber crosses zero, and then the auxiliary switch S2 is opened to complete the breaking of the entire circuit.

In one embodiment, a cable lap joint, a busbar arrester and/or a current transformer are further arranged in the cable compartment 4. The cable lap joint provides the user with a connection between the cable and the conductor 6. The current transformer is configured to acquire current values in the line. The busbar arrester is configured to quickly release overvoltage when a high voltage invades, so as to protect electrical equipment connected to the busbar from being endangered by high transient overvoltage.

In one embodiment, a ground switch 10 connected with the second fixed contact F2 and a cabinet door mechanically interlocked with the ground switch 10 are further arranged in the cable compartment 4, and the cabinet door may be designed to be openable only when the ground switch 10 is closed. By means of such arrangement, it can be ensured that the cable connected to the conductor 6 has been grounded when the overhaul and maintenance personnel opens up the cabinet door of the cable compartment 4, thereby avoiding electric shock accidents.

In one embodiment, a discharge device for discharging the capacitor $C_2$ in the commutation branch 12 is further arranged in the DC switchgear 100, for example, in the handcart compartment 2, so as to avoid the residual voltage of the capacitor $C_2$ from endangering the safety of the overhaul and maintenance personnel. The discharge device may be implemented using, for example, a discharge resistor. For example, the discharge resistor is designed to be connected with the capacitor $C_2$ in the commutation branch 12 when the handcart 8 moves out of the handcart compartment 2, so as to discharge the capacitor $C_2$ during the handcart 8 exiting the handcart compartment 2.

In one embodiment, independent pressure-releasing pathways are respectively arranged in the handcart compartment 2, the busbar compartment 3 and the cable compartment 4. The pressure-releasing pathways may be implemented in various ways. For example, taking the busbar compartment 3 as an example, an opening, e.g., a rectangular opening, may be arranged at its top plate as a pressure-releasing opening, over which a pressure-releasing cover may be arranged, and a connecting part may be arranged between the pressure-releasing opening and the pressure-releasing cover. The connecting part is designed to be always fixed on the top plate during pressure-releasing. When arcing, or gas with high-temperature and high-pressure occurs inside the DC switchgear 100, the generated energy impacts the pressure-releasing cover to cause the pressure-releasing cover to be opened up, thereby excluding arcing energy, or gas with high-temperature and high-pressure from the DC switchgear 100. For example, an incision, e.g., a long and narrow incision, may be further arranged on the pressure-releasing cover to reduce the strength of the pressure-releasing cover and make it easy to be impacted open.

In one embodiment, a shutter is further arranged in the handcart compartment 2, and the shutter is designed to automatically fall down to enclose the first fixed contact F1 and the second fixed contact F2 when the handcart 8 moves out of the handcart compartment 2. By means of such arrangement, it is can avoided that the overhaul and maintenance personnel accidentally touch the first fixed contact F1 and the second fixed contact F2 which cloud be electrified.

In one embodiment, the DC switchgear 100 may further include an voltage presence indicating display device, as indicated by reference numeral 14 in FIG. 3, which may be disposed on, for example, the cabinet door of the cable compartment 4, the panel of the instrument compartment 1, and the like. The voltage presence indicating display device 14 may include, for example, a voltage presence sensor and a display unit. The voltage presence sensor is configured to detect whether the cable is electrified, and the display unit is configured to display the detection result of the voltage presence sensor and display a voltage presence warning when the cable is detected as electrified.

The DC switchgear 100 according to the embodiments of the present disclosure has been described above, which simplifies the structure and layout of the cabinet body of the DC switchgear 100 by installing the circuit structure including the current-carrying branch, the commutation branch and the energy-absorbing circuit on the handcart, thereby facilitating separate tests for the circuit structure, and improving the convenience and reliability of later overhaul and maintenance of the DC switchgear 100.

It should be understood by those skilled in the art that, the above-mentioned specific embodiments are merely examples rather than limitations, and various modifications, combinations, partial combinations and substitutions can be made to the embodiments of the present disclosure according to design requirements and other factors, as long as they are within the scope of the appended claims or their equivalents, that is, they belong to the scope of rights to be protected by the present disclosure.

The invention claimed is:

1. A DC switchgear, comprising:
an instrument compartment in which secondary components for monitoring, protecting and measuring are arranged;
a busbar compartment in which a main busbar and a first fixed contact connected with the main busbar are arranged;
a cable compartment in which a conductor is arranged for connecting to a cable, and a second fixed contact connected with the conductor is further arranged in the cable compartment or the busbar compartment; and
a handcart compartment and a handcart, wherein the handcart is capable of moving in and out of the handcart compartment, and wherein a current-carrying branch, a commutation branch and an energy-absorbing branch are arranged on the handcart, a first movable contact and a second movable contact respectively for contacting with the first fixed contact and the second fixed contact are further arranged on the handcart, and the first movable contact and the second movable contact are respectively connected to both ends of the current-carrying branch, and wherein, in a circuit structure, the commutation branch and the energy-absorbing branch are connected to the current-carrying branch.

2. The DC switchgear according to claim 1, wherein, the first fixed contact is arranged in a first insulating box, the second fixed contact is arranged in a second insulating box, the first movable contact contacts with the first fixed contact within the first insulating box, and the second movable contact contacts with the second fixed contact within the second insulating box.

3. The DC switchgear according to claim 2, wherein, the first insulating box is designed to pass through a partition board between the busbar compartment and the handcart compartment so that the first movable contact is able to contact with the first fixed contact;
in a case that the second fixed contact is arranged in the busbar compartment, the second insulating box is designed to pass through the partition board between the busbar compartment and the handcart compartment so that the second movable contact is able to contact with the second fixed contact; or in a case that the second fixed contact is arranged in the cable compartment, the second insulating box is designed to pass through a partition board between the cable compartment and the busbar compartment and the partition board between the busbar compartment and the handcart compartment so that the second movable contact is able to contact with the second fixed contact.

4. The DC switchgear according to claim 1, wherein, in a case that the second fixed contact is arranged in the busbar compartment, an insulating sleeve is further arranged in the cable compartment, wherein the insulating sleeve is designed to pass through a partition board between the cable compartment and the busbar compartment so that the conductor is connected with the second fixed contact through the insulating sleeve.

5. The DC switchgear according to claim 1, wherein, the current-carrying branch is configured to carry a current loop during normal operation of a line, and includes a main switch and an auxiliary switch which are connected in series, wherein the main switch is connected to the first movable contact, and the auxiliary switch is connected to the second movable contact;
the commutation branch is configured to produce an oscillation loop and create a zero-crossing point of current when breaking a line fault, and includes a capacitor, a commutation switch and a reactor which are connected in series, wherein the commutation branch is connected in parallel with the main switch;
the energy-absorbing branch is configured to absorb residual energy after breaking the line fault, and includes an energy absorber which is connected in parallel with the commutation branch.

6. The DC switchgear according to claim 5, further comprising:
a discharging device for discharging the capacitor in the commutation branch.

* * * * *